United States Patent
Matsuoka et al.

(10) Patent No.: US 9,444,287 B2
(45) Date of Patent: Sep. 13, 2016

(54) POWER CONVERSION DEVICE WITH RIPPLE FILTERING

(75) Inventors: Kazumasa Matsuoka, Minato-ku (JP); Katsumi Ikeda, Chiyoda-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 861 days.

(21) Appl. No.: 13/640,319

(22) PCT Filed: Apr. 12, 2010

(86) PCT No.: PCT/JP2010/056529
§ 371 (c)(1),
(2), (4) Date: Oct. 10, 2012

(87) PCT Pub. No.: WO2011/128962
PCT Pub. Date: Oct. 20, 2011

(65) Prior Publication Data
US 2013/0026834 A1    Jan. 31, 2013

(51) Int. Cl.
*H02J 9/06* (2006.01)
*H02M 5/458* (2006.01)

(52) U.S. Cl.
CPC ........... *H02J 9/062* (2013.01); *H02M 5/4585* (2013.01); *Y10T 307/615* (2015.04)

(58) Field of Classification Search
None
See application file for complete search history.

(56) References Cited

U.S. PATENT DOCUMENTS

| | | | |
|---|---|---|---|
| 4,626,978 A * | 12/1986 | Thouvenin | H02M 5/4505 219/665 |
| 5,050,057 A * | 9/1991 | Notohara et al. | 363/37 |
| 5,218,520 A * | 6/1993 | Rozman et al. | 363/39 |
| 7,403,404 B2 * | 7/2008 | Oka et al. | 363/40 |
| 2011/0026281 A1 * | 2/2011 | Chapman et al. | 363/65 |
| 2011/0043150 A1 * | 2/2011 | Ogawa et al. | 318/400.26 |

FOREIGN PATENT DOCUMENTS

| | | |
|---|---|---|
| JP | 5 49261 | 2/1993 |
| JP | 7 298516 | 11/1995 |
| JP | 8-172776 A | 7/1996 |
| JP | 10-94267 A | 4/1998 |
| JP | 11-191962 A | 7/1999 |
| JP | 11 299244 | 10/1999 |
| JP | 2007-300712 A | 11/2007 |
| JP | 2009-273330 A | 11/2009 |
| WO | WO 2009133700 A1 * | 11/2009 |

OTHER PUBLICATIONS

English machine translation of JP 5-49261.*
English machine translation of JP 11-299244.*
Japanese Office Action issued May 7, 2014 in Patent Application No. 2012-510484 with English Translation.
International Search Report Issued Jul. 13, 2010 in PCT/JP10/056529 Filed Apr. 12, 2010.

* cited by examiner

*Primary Examiner* — Rexford Barnie
*Assistant Examiner* — David Shiao
(74) *Attorney, Agent, or Firm* — Oblon, McClelland, Maier & Neustadt, L.L.P.

(57) ABSTRACT

An uninterruptible power supply device including a filter for rejecting, in the voltage of a power supply node between a converter and an inverter, a ripple voltage of a frequency twice a frequency of an output voltage of the inverter to generate a DC voltage. This filter includes an extraction unit for extracting the ripple voltage from the voltage of the power supply node, and a subtraction unit for subtracting the ripple voltage extracted by the extraction unit from the voltage of the power supply node to generate the DC voltage.

6 Claims, 3 Drawing Sheets

POWER CONVERSION DEVICE WITH RIPPLE FILTERING

TECHNICAL FIELD

The present invention relates to a power conversion device, and more particularly relates to a power conversion device including a converter and an inverter.

BACKGROUND ART

Conventionally, an uninterruptible power supply device is widely used as a power supply device for stably supplying AC power to a fundamental load such as a computer system. As shown in, for example, Japanese Patent Laying-Open No. 7-298516 (PTL 1), an uninterruptible power supply device generally includes a converter for converting commercial AC power into DC power, and an inverter for converting DC power into AC power for supply to a load. In a normal state where commercial AC power is supplied, DC power generated in the converter is supplied to the inverter and is also stored in a battery. In a power interruption state where supply of commercial AC power is interrupted, the converter is stopped operating, and DC power is supplied from the battery to the inverter.

CITATION LIST

Patent Literature

PTL 1: Japanese Patent Laying-Open No. 7-298516

SUMMARY OF INVENTION

Technical Problem

Such an uninterruptible power supply device is provided with a capacitor for smoothing the voltage of a power supply node between the converter and the inverter. The capacitance value of the capacitor is set at a sufficiently large value such that a ripple voltage will not be caused at the power supply node when the inverter supplies AC power to the load.

However, the capacitor will be more expensive as the capacitor is increased in capacitance value. In order to reduce the device cost, it is necessary to reduce the capacitor in capacitance value to such an extent that the life of the device and the load will not be adversely affected.

Moreover, some uninterruptible power supply devices are provided with a control unit for controlling the converter such that an input voltage and an input current to the converter are in phase in order to achieve improved efficiency. With such a device, when a ripple voltage is caused at the power supply node by reducing the capacitor in capacitance value, distortion of waveform of input current will be increased, which degrades efficiency. As a method for solving this phenomenon, providing a low order filter for rejecting a ripple voltage between the power supply node and the control unit is conceivable, however, that method will degrade the control unit in responsiveness and reduce efficiency.

It is therefore a main object of the present invention to provide a low-cost, highly-efficient power conversion device.

Solution to Problem

A power conversion device according to the present invention includes a converter for converting first AC power into DC power, an inverter for converting the DC power into second AC power, a capacitor for smoothing a voltage of a power supply node between the converter and the inverter, a filter for rejecting, in the voltage of the power supply node, a ripple voltage of a predetermined frequency to generate a DC voltage, and a control unit for controlling the converter such that the DC voltage matches a target voltage. The filter includes an extraction unit for extracting the ripple voltage from the voltage of the power supply node, and a subtraction unit for subtracting the ripple voltage extracted by the extraction unit from the voltage of the power supply node to generate the DC voltage.

Preferably, the extraction unit includes a coordinate transformation unit for transforming a coordinate of the voltage of the power supply node from a stationary coordinate to a rotating coordinate rotating at the predetermined frequency, a low order filter for rejecting an AC component in the voltage of the power supply node on the rotating coordinate, and a coordinate inverse transformation unit for inversely transforming the coordinate of an output voltage of the low order filter from the rotating coordinate to the stationary coordinate to generate the ripple voltage.

More preferably, the predetermined frequency is twice a frequency of an output voltage of the inverter.

Still more preferably, the voltage of the power supply node further contains an AC component of a switching frequency of the inverter, and the filter rejects, in the voltage of the power supply node, the ripple voltage and the AC component of the switching frequency of the inverter to generate the DC voltage.

Still more preferably, the control unit controls the converter such that an input voltage and an input current to the converter are in phase and that the DC voltage matches the target voltage.

Still more preferably, the first AC power is supplied from a commercial AC power supply. In a normal state where the first AC power is supplied from the commercial AC power supply, the DC power is supplied to the converter and is stored in a power storage device. In a power interruption state where supply of the first AC power from the commercial AC power supply is interrupted, the converter is stopped operating, and the DC power is supplied from the power storage device to the converter.

ADVANTAGEOUS EFFECTS OF INVENTION

With the power conversion device according to the present invention, a ripple voltage of a predetermined frequency is extracted from the voltage of the power supply node between the converter and the inverter, the extracted ripple voltage is subtracted from the voltage of the power supply node to generate a DC voltage, and the converter is controlled such that the DC voltage matches a target voltage. Since the influence of a ripple voltage, if caused at the power supply node, can thereby be removed, the capacitance value of the capacitor can be reduced to achieve cost reduction. Moreover, since only the ripple voltage of a predetermined frequency is rejected in the voltage of the power supply node, the responsiveness of the control unit will not deteriorate, and efficiency will not be reduced.

DESCRIPTION OF EMBODIMENTS

Figure 1:
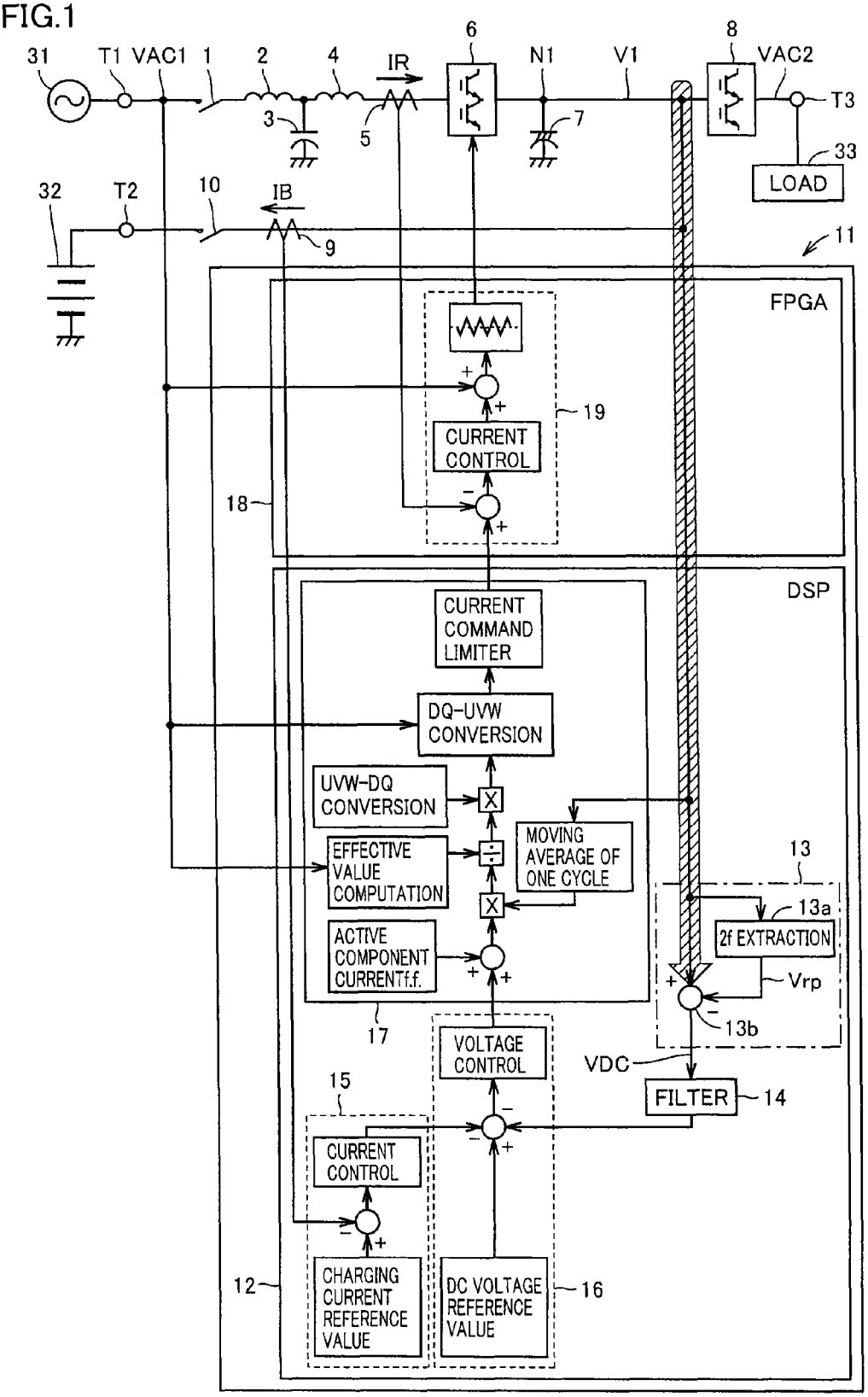
FIG. 1 is a circuit block diagram showing a principal portion of an uninterruptible power supply device according to an embodiment of the present invention.

An uninterruptible power supply device of the present embodiment includes an input terminal T1, a battery terminal T2, an output terminal T3, breakers 1, 10, inductors 2, 4, capacitors 3, 7, current sensors 5, 9, a converter 6, an inverter 8, and a converter control unit 11, as shown in FIG. 1.

Input terminal T1 receives an AC voltage VAC1 from a commercial AC power supply 31. A battery 32 has its positive electrode connected to battery terminal T2. Battery 32 has its negative electrode connected to a line of reference voltage. An important load 33 such as, for example, a computer is connected to output terminal T3.

It is noted that, since the present invention relates to control of converter 6, the structure relevant to control of inverter 8 is not illustrated for the sake of simplifying the illustration and description. Although commercial AC power supply 31 outputs a three-phase AC voltage, the structure and operation for one phase alone will be described for the sake of simplifying the illustration and description. Inverter 8 may output a single phase AC voltage alone, or may output a three-phase AC voltage.

Breaker 1 has its one terminal connected to input terminal T1, and its other terminal connected to the input node of converter 6 with inductors 2 and 4 interposed therebetween. Breaker 1 is turned on during use of the uninterruptible power supply device, and is turned off during maintenance of the device and the like.

Capacitor 3 has its one terminal connected to a node between inductors 2 and 4, and its other terminal connected to the line of reference voltage. Inductors 2, 4 and capacitor 3 constitute an input filter (low-pass filter) for passing AC voltage VAC1 from commercial AC power supply 31 to converter 6 and cutting off noise of switching frequency (e.g., 10 kHz) caused in converter 6. This prevents the noise of switching frequency caused in converter 6 from flowing to commercial AC power supply 31 side to adversely affect another electric instrument.

Current sensor 5 is provided between inductor 4 and converter 6, and detects an input current IR to converter 6 to supply a signal indicating a detection result to converter control unit 11. Converter 6 is controlled by a PWM (Pulse Width Modulation) signal from converter control unit 11, and converts AC power from the commercial AC power supply into DC power for supply to inverter 8. Converter 6 is a well-known converter including a plurality of IGBTs (Insulated Gate Bipolar Transistors).

Capacitor 7 is connected between a power supply node N1 between converter 6 and inverter 8 and the line of reference voltage to smooth a voltage V1 of power supply node N1. Inverter 8 is controlled by a PWM signal from an inverter control unit (not shown), and converts DC power from converter 6 or battery 32 into AC power of commercial frequency, and supplies the AC power to load 33 through output terminal T3. Inverter 8 is a well-known inverter including a plurality of IGBTs. Load 33 is driven by the AC power supplied from inverter 8.

Power supply node N1 is connected to converter control unit 11, and is also connected to battery terminal T2 with breaker 10 interposed therebetween. Breaker 10 is turned on during use of the uninterruptible power supply device, and is turned off during maintenance of the device and the like.

In a normal state where AC power is supplied from commercial AC power supply 31, battery 32 stores DC power supplied from converter 6 through breaker 10. In a power interruption state where the supply of commercial AC power from commercial AC power supply 31 is interrupted, battery 32 supplies DC power to inverter 8 through breaker 10. This allows AC power to be supplied to load 33 during a period in which electric power is left in battery 32 even in a power interruption.

Current sensor 9 is provided between power supply node N1 and breaker 10, and detects a current IB flowing from power supply node N1 to battery 32 to supply a signal indicating a detection result to converter control unit 11.

Converter control unit 11 detects AC voltage VAC1 of input terminal T1 and voltage V1 of power supply node N1. Converter control unit 11 controls converter 6 such that voltage V1 of power supply node N1 matches a target voltage (e.g., 400V), the waveform of input current IR of converter 6 is sinusoidal, and input voltage VAC1 and input current IR to converter 6 are in phase. When input voltage VAC1 and input current IR to converter 6 are brought into phase, the power factor will be 1.0, and efficiency will be improved. Converter control unit 11 also controls converter 6 such that current IB flowing from power supply node N1 to battery 32 matches a target current (e.g., 10 A).

In such an uninterruptible power supply device, the capacitance value of capacitor 7 is usually set at a sufficiently large value such that voltage V1 of power supply node N1 is a constant DC voltage. However, to reduce the cost of the device, the capacitance value of capacitor 7 is set at a small value in some cases to such an extent that the life of capacitor 7 and load 33 will not be adversely affected.

Figure 2:
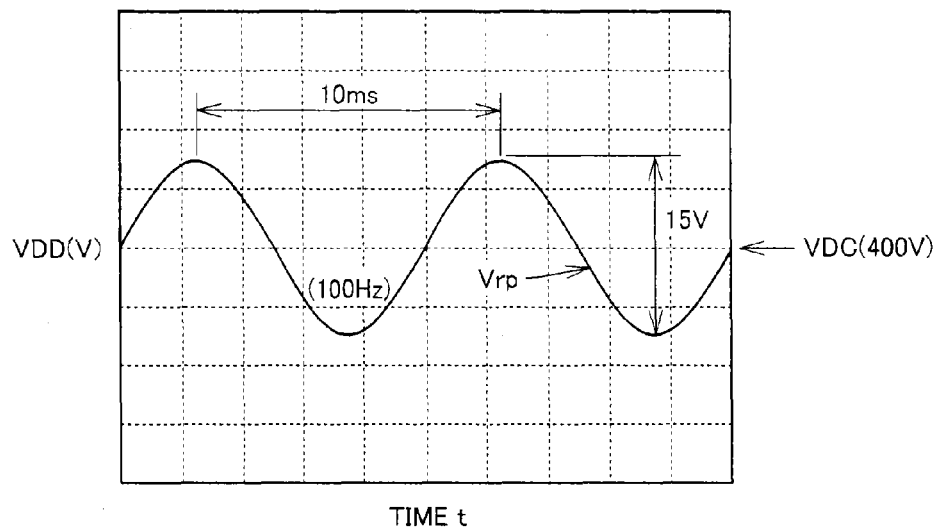
FIG. 2 is a waveform diagram of a ripple voltage caused at a power supply node shown in FIG. 1.

In such a case, when inverter 8 supplies AC power to load 33, a ripple voltage Vrp of a frequency 2f (in this case, 100 Hz) which is twice a frequency f (e.g., 50 Hz) of an AC voltage VAC2 output from inverter 8 is produced, as shown in FIG. 2. Ripple voltage Vrp varies sinusoidally, whose voltage magnitude is 15V, for example. Ripple voltage Vrp is superimposed on a DC voltage VDC (e.g., 400V). It is noted that noise of switching frequency (e.g., 10 kHz) of inverter 8 is also caused at power supply node N1.

Converter control unit 11 is formed by a DSP (Digital Signal Processor) 12 and an FPGA (Field Programmable Gate Array) 18. DSP 12 includes a 2f rejection filter 13, a filter 14, a battery charging current control unit 15, a DC voltage control unit 16, and an input current command generation unit 17. FPGA 18 includes an input current control unit 19.

2f rejection filter 13 includes an extraction unit 13a for extracting ripple voltage Vrp from voltage V1 of power supply node N1, and a subtracter 13b for subtracting ripple voltage Vrp from voltage V1 of power supply node N1 to generate DC voltage VDC.

Figure 3:
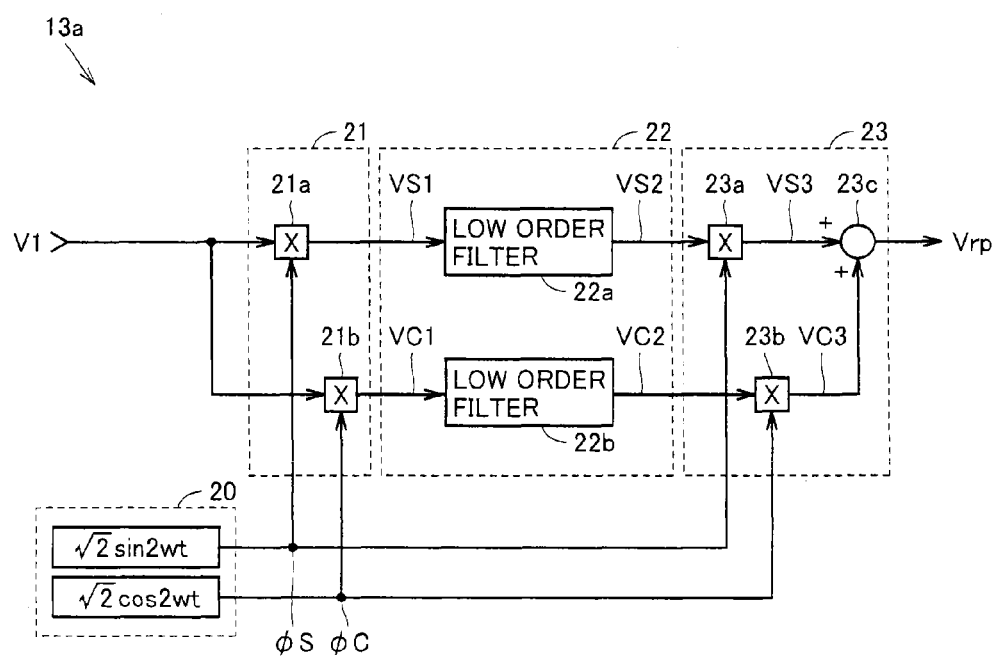
FIG. 3 is a block diagram showing a structure of a 2f rejection filter shown in FIG. 1.

Extraction unit 13a includes a signal generation unit 20, a coordinate transformation unit 21, a filter unit 22, and a coordinate inverse transformation unit 23, as shown in FIG. 3. Signal generation unit 20 generates a cosine wave signal $\phi S$ ($=\sqrt{2}\ \sin 2\omega t$) and a sine wave signal $\phi C$ ($=\sqrt{2}\ \cos 2\omega t$). Signals $\phi S$ and $\phi C$ each have frequency 2f twice frequency f of output voltage VAC2 of inverter 8.

Coordinate transformation unit 21 transforms the coordinates of voltage V1 of power supply node N1 from stationary coordinates to rotating coordinates rotating at a frequency twice frequency f of the output voltage of inverter 8.

That is, coordinate transformation unit 21 includes a multiplier 21a for multiplying voltage V1 of power supply node N1 by cosine wave signal φS to generate a voltage VS1, and a multiplier 21b for multiplying voltage V1 of power supply node N1 by sine wave signal φC to generate a voltage VC1. On the rotating coordinates, voltage V1 of power supply node N1 is expressed by output voltages VS1 and VC1 of multipliers 21a and 21b.

Filter unit 22 includes a low order filter 22a for rejecting an AC component in output voltage VS1 of multiplier 21a, and a low order filter 22b for rejecting an AC component in output voltage VC1 of multiplier 21b. AC components of frequencies other than frequency 2f twice frequency f of the output voltage of inverter 8 are thereby rejected. On the rotating coordinates, ripple voltage Vrp caused at power supply node N1 is expressed by output voltages VS2 and VC2 of low order filters 22a and 22b.

Coordinate inverse transformation unit 23 inversely transforms the coordinates of output voltage VS2 and VC2 of low order filters 22a and 22b from the rotating coordinates to stationary coordinates to generate ripple voltage Vrp. That is, coordinate inverse transformation unit 23 includes a multiplier 23a for multiplying output voltage VS2 of low order filter 22a by cosine wave signal φS to generate a voltage VS3, a multiplier 23b for multiplying output voltage VS2 of low order filter 22b by cosine wave signal φC to generate a voltage VC3, and an adder 23c for adding output voltages VS3 and VC3 of multipliers 23a and 23b to generate ripple voltage Vrp.

Ripple voltage Vrp is given to subtracter 13b shown in FIG. 1. Subtracter 13b subtracts ripple voltage Vrp from voltage V1 of power supply node N1 to generate DC voltage VDC. Filter 14 is a high pass filter for rejecting noise of switching frequency of inverter 8 caused at power supply node N1 while inverter 8 is operated, and the like.

Battery charging current control unit 15 outputs a current control signal based on the output signal from current sensor 9 such that current IB flowing from power supply node N1 to battery 32 matches a battery current reference value. DC voltage control unit 16 receives the output signal from battery charging current control unit 15 and DC voltage VDC obtained by rejecting noise by filter 14 to output a voltage control signal such that DC voltage VDC matches a DC voltage reference value (target voltage).

Input current command generation unit 17 receives AC voltage VAC1 from commercial AC power supply 31, voltage V1 of power supply node N1, and the output signal from DC voltage control unit 16. Input current command generation unit 17 adds an inverter active component current feed forward to the output signal from DC voltage control unit 16, and further, multiplies the summation by a moving average value of one cycle of voltage V1 of power supply node N1 to generate a DC command value. Adding the inverter current feed forward is intended for compensation for a phase delay of input current IR to converter 6.

Input current command generation unit 17 also computes an effective value of AC input voltage VAC1, and divides the DC command value by that effective value to generate an input current effective value command. Input current command generation unit 17 further performs UVW-DQ conversion on the input current effective value command to generate a DC input current effective value command, and generates an AC input current command based on that DC input current effective value command and AC input voltage VAC1. The AC input current command varies sinusoidally, and is in phase with AC input voltage VAC1. The input current command is limited to a level lower than a predetermined upper limit value by a current command limiter of input current command generation unit 17, and is given to input current control unit 19.

Input current control unit 19 receives the output signal from current sensor 5 and the input current command from input current command generation unit 17 to generate a current command signal such that input current IR to converter 6 matches the input current command. Input current control unit 19 further corrects the current command signal based on AC input voltage VAC1 so as to compensate for the phase delay of input current IR to converter 6, and converts the corrected current command signal into a PWM signal for supply to converter 6. Converter 6 converts AC power from commercial AC power supply 31 into DC power in accordance with the PWM signal from input current control unit 19. Input current IR to converter 6 thereby varies sinusoidally, and input voltage VAC1 and input current IR to converter 6 are brought into phase.

Figure 4:
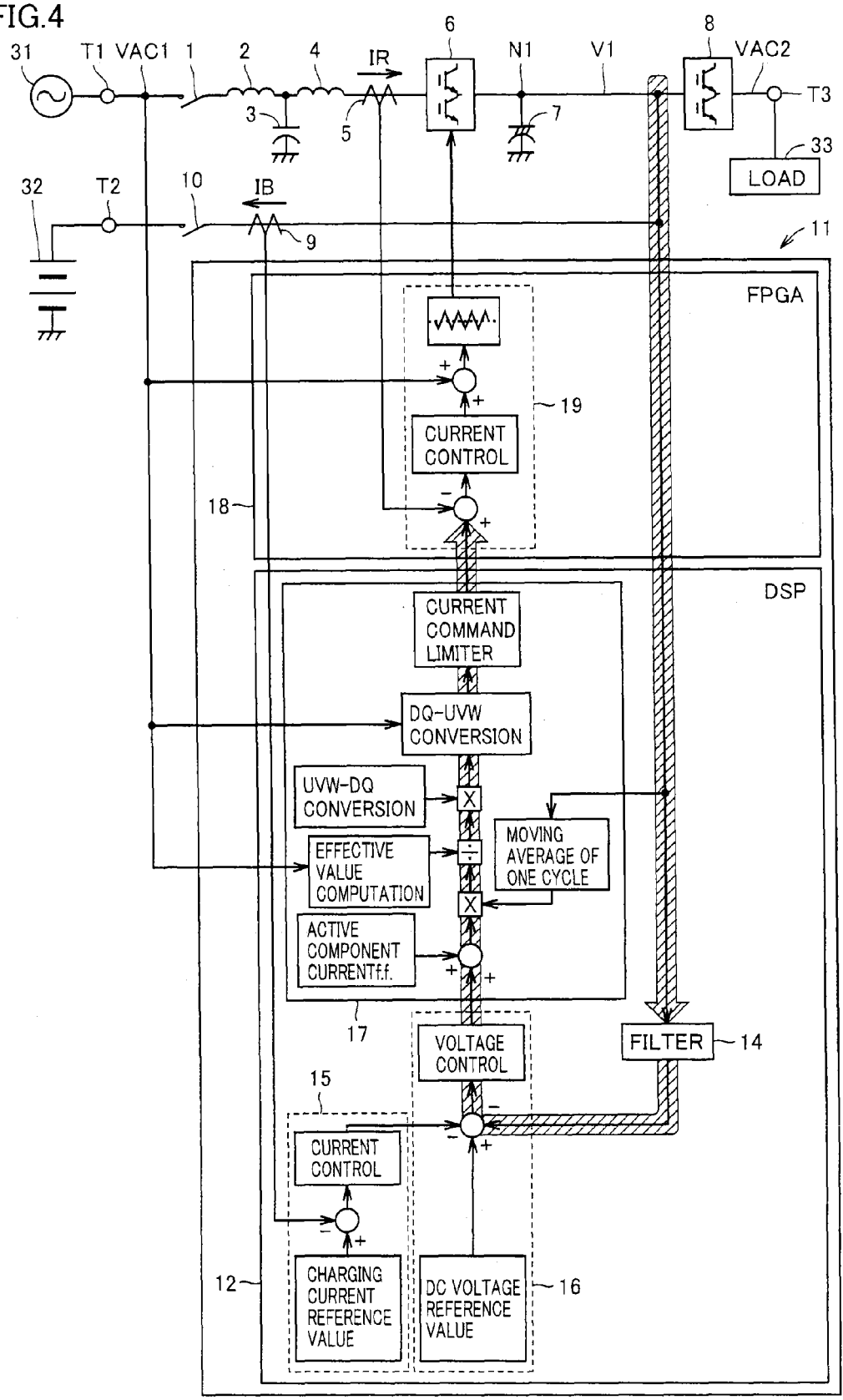
FIG. 4 is a circuit block diagram showing a comparative example of the embodiment.

FIG. 4 is a circuit block diagram showing a structure of an uninterruptible power supply device serving as a comparative example of this embodiment to be compared with FIG. 1. The difference of this comparative example from the embodiment resides in that 2f rejection filter 13 is not provided. Filter 14 is a high pass filter for rejecting noise of high frequency such as the switching frequency of inverter 8. Therefore, voltage fluctuations at low frequency as in ripple voltage Vrp are transmitted to DC voltage control unit 16 passing through filter 14.

Ripple voltage Vrp is amplified by DC voltage control unit 16, and is superimposed on the input current effective value command. When DQ-UVW conversion is performed on the input current effective value command including ripple voltage Vrp of 100 Hz (frequency 2f) to generate an AC input current command, a ripple of 150 Hz (frequency 3f) is superimposed on the input current command. This ripple distorts the waveform of input current IR. Although the defined value of distortion rate of input current IR is less than or equal to 3% as a whole, the actual measurement of distortion rate of input current IR in the comparative example deteriorated to 5% as a whole.

If filter 14 is implemented by a low order filter (about 5 rad/s), ripple voltage Vrp could be rejected by filter 14. In that case, however, the responsiveness of DC voltage control unit 16 (about 100 rad/s in proportional control, and about 20 rad/s in integral control) could no longer be satisfied.

In contrast, according to the present invention in which 2f rejection filter 13 for rejecting ripple voltage Vrp alone is added, the distortion rate of input current can be reduced without degrading the responsiveness of DC voltage control unit 16. According to the present invention, an actual measurement of distortion rate of input current IR was less than or equal to 2.0% as a whole. Moreover, since capacitor 7 with a small capacitance value can be used, the device price can be reduced.

It should be understood that the embodiment disclosed herein is illustrative and non-restrictive in every respect. The scope of the present invention is defined by the claims not by the description above, and is intended to include any modification within the meaning and scope equivalent to the terms of the claims.

REFERENCE SIGNS LIST 1, 10 breaker; 2, 4 inductor; 3, 7 capacitor; 5, 9 current sensor; 6 converter; 8 inverter; 11 converter control unit; 13 2f rejection filter; 13a extraction unit; 13b subtracter; 14 filter; 15 battery charging current control unit; 16 DC voltage control unit; 17 input current command generation unit; 19 input current control unit; 20 signal generation unit; 21 coordinate transformation unit; 21a, 21b, 23a, 23b multiplier; 22 filter unit; 22a, 22b low order filter; 23 coordinate inverse transformation unit; 23c adder; 31 commercial AC power supply; 32 battery; 33 load; N1 power supply node; T1 input terminal; T2 battery terminal; T3 output terminal.

The invention claimed is:

1. A power conversion device comprising:
   a converter configured to convert first AC power into DC power for output to a power supply node;
   an inverter configured to convert said DC power supplied from converter through said power supply node into second AC power;
   a capacitor connected between said power supply node and a line of reference voltage, wherein
      a capacitance value of said capacitor is set at a smaller value than a capacitance value to smooth a voltage of said power supply node, and
      the voltage of said power supply node is a voltage obtained by superimposing, on a DC voltage, a ripple voltage varying sinusoidally at a frequency twice a frequency of an output voltage of said inverter,
   a filter configured to receive the voltage of said power supply node and reject said ripple voltage in the received voltage to pass a DC voltage component; and
   a control circuit configured to control said converter such that said DC voltage component passed through said filter matches a target voltage,
   said filter including:
      an extraction circuit configured to extract said ripple voltage from the voltage of said power supply node, and
      a subtraction circuit configured to subtract said ripple voltage extracted by said extraction circuit from the voltage of said power supply node to generate said DC voltage component,
   said extraction circuit including;
      a coordinate transformation circuit configured to transform a coordinate of the voltage of said power supply node from a stationary coordinate to a rotating coordinate rotating at the frequency twice the frequency of the Output voltage of said inverter,
      a low order filter configured to reject an AC component in the voltage of said power supply node on said rotating coordinate, and
      a coordinate inverse transformation circuit configured to inversely transform the coordinate of an output voltage of said low order filter from said rotating coordinate to said stationary coordinate to generate said ripple voltage, wherein said filter is implemented by a digital signal processor (DSP).

2. The power conversion device according to claim 1, wherein
   the voltage of said power supply node further contains an AC component of a switching frequency of said inverter, and
   said filter rejects, in the voltage of said power supply node, said ripple voltage and the AC component of the switching frequency of said inverter to pass said DC voltage component.

3. The power conversion device according to claim 1, wherein said control circuit controls said converter such that an input voltage and an input current to said converter are in phase and that said DC voltage component matches said target voltage.

4. The power conversion device according to claim 1, wherein
   said first AC power is supplied from a commercial AC power supply,
   in a normal state where said first AC power is supplied from said commercial AC power supply, said DC power is supplied to said inverter and is stored in a power storage device, and
   in a power interruption state where supply of said first AC power from said commercial AC power supply is interrupted, said converter stops operating, and the DC power is supplied from said power storage device to said inverter.

5. The power conversion device according to claim 1, wherein the capacitor is connected between said power supply node and ground.

6. The power conversion device according to claim 1, further comprising:
   another capacitor, wherein a first node of the another capacitor is connected between a power supply and the converter, and a second node of the another capacitor is connected to ground.

* * * * *